(12) United States Patent
Tamura et al.

(10) Patent No.: US 11,867,258 B2
(45) Date of Patent: Jan. 9, 2024

(54) V-RIBBED BELT

(71) Applicant: Mitsuboshi Belting Ltd., Kobe (JP)

(72) Inventors: Masashi Tamura, Hyogo (JP); Takeshi Nishiyama, Hyogo (JP); Manabu Mitsutomi, Hyogo (JP); Hiroshi Matsumura, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 1022 days.

(21) Appl. No.: 16/628,360

(22) PCT Filed: Jul. 4, 2018

(86) PCT No.: PCT/JP2018/025406
§ 371 (c)(1),
(2) Date: Jan. 3, 2020

(87) PCT Pub. No.: WO2019/009339
PCT Pub. Date: Jan. 10, 2019

(65) Prior Publication Data
US 2020/0217396 A1    Jul. 9, 2020

(30) Foreign Application Priority Data

Jul. 4, 2017  (JP) .................................. 2017-130977
Jun. 27, 2018 (JP) .................................. 2018-122265

(51) Int. Cl.
*F16G 5/06* (2006.01)
*F16G 5/20* (2006.01)
*F16G 5/08* (2006.01)

(52) U.S. Cl.
CPC ................. *F16G 5/06* (2013.01); *F16G 5/08* (2013.01); *F16G 5/20* (2013.01)

(58) Field of Classification Search
CPC ..... F16G 5/00; F16G 5/04; F16G 5/08; F16G 5/20; F16G 5/22; F16G 1/00; F16G 1/04;
(Continued)

(56) References Cited

U.S. PATENT DOCUMENTS 4,790,802 A * 12/1988 Onoe ........................ F16G 5/06
                                                57/902
4,904,232 A *  2/1990 Kitahama ................. F16G 5/10
                                                474/266
(Continued)

FOREIGN PATENT DOCUMENTS

EP    2871387 A1    5/2015
EP    3396202 A1   10/2018
(Continued)

OTHER PUBLICATIONS

Feb. 26, 2021—(EP) Extended Search Report—App 18828658.7.
(Continued)

*Primary Examiner* — Michael R Mansen
*Assistant Examiner* — Raveen J Dias
(74) *Attorney, Agent, or Firm* — Banner & Witcoff, Ltd.

(57) ABSTRACT

The present invention relates to a V-ribbed belt that includes carbon-fiber twisted cords as core wires, the V-ribbed belt having a tensile elasticity of 240-500 N/(mm·%), and the core wire diameter of the core wires being 0.6-1.2 mm. The V-ribbed belt may have a tensile strength of 620 N/mm or more per 1 mm width of the belt.

9 Claims, 1 Drawing Sheet

(58) Field of Classification Search
CPC ..... F16G 1/06; F16G 1/08; F16G 1/10; F16G 1/28; B29D 29/08; B29D 29/085; B29D 29/10; B29D 29/103; B29D 29/106; B32B 2433/02; B32B 4433/04
See application file for complete search history.

(56) References Cited

U.S. PATENT DOCUMENTS

| | | | | |
|---|---|---|---|---|
| 4,956,036 A * | 9/1990 | Sedlacek | ................ | F16G 5/06 156/154 |
| 5,045,138 A * | 9/1991 | Mashimo | ................ | F16G 5/06 156/137 |
| 5,244,436 A * | 9/1993 | Kurokawa | ................ | F16G 5/06 474/260 |
| 5,413,538 A * | 5/1995 | Mishima | ................ | F16G 1/28 474/263 |
| 5,427,637 A * | 6/1995 | Mishima | ................ | F16G 5/06 156/137 |
| 5,521,007 A * | 5/1996 | Kurokawa | ................ | F16G 5/06 428/397 |
| 5,610,217 A * | 3/1997 | Yarnell | ................ | C08K 5/098 524/427 |
| 6,491,598 B1 * | 12/2002 | Rosenboom | ............ | B32B 25/10 474/263 |
| 2002/0015825 A1 * | 2/2002 | Meco | ................ | F16G 1/28 428/421 |
| 2002/0132692 A1 | 9/2002 | Knutson | | |
| 2002/0165058 A1 | 11/2002 | Swope | | |
| 2003/0130077 A1 | 7/2003 | Knutson | | |
| 2003/0176539 A1 * | 9/2003 | Feuerborn | ................ | F16G 5/20 524/27 |
| 2003/0203781 A1 * | 10/2003 | Welk | ................ | F16G 5/20 474/263 |
| 2003/0211911 A1 * | 11/2003 | Welk | ................ | F16G 5/08 474/263 |
| 2004/0033857 A1 * | 2/2004 | Welk | ................ | F16G 5/20 474/263 |
| 2004/0132571 A1 | 7/2004 | Knutson | | |
| 2005/0202916 A1 * | 9/2005 | Wu | ................ | F16G 1/28 474/237 |
| 2006/0213174 A1 * | 9/2006 | Wu | ................ | F16G 1/10 57/237 |
| 2007/0098983 A1 * | 5/2007 | Akiyama | ................ | F16G 1/28 428/375 |
| 2007/0249452 A1 * | 10/2007 | South | ................ | F16G 5/20 474/263 |
| 2008/0026897 A1 * | 1/2008 | Nakashima | ................ | F16G 5/04 474/263 |
| 2009/0011884 A1 * | 1/2009 | Nakashima | ................ | F16G 5/20 474/205 |
| 2009/0142572 A1 * | 6/2009 | Burlett | ................ | F16G 1/08 156/137 |
| 2009/0227406 A1 * | 9/2009 | Wu | ................ | C08G 18/4277 474/260 |
| 2009/0298633 A1 * | 12/2009 | Hineno | ................ | F16G 5/06 474/263 |
| 2010/0267863 A1 * | 10/2010 | Furusawa | ................ | F16G 1/08 428/394 |
| 2010/0298079 A1 * | 11/2010 | Shiriike | ................ | F16G 5/20 474/237 |
| 2011/0070989 A1 | 3/2011 | Duke et al. | | |
| 2011/0086735 A1 * | 4/2011 | Takahashi | ................ | C08K 3/04 524/495 |
| 2011/0118068 A1 * | 5/2011 | Mitsutomi | ................ | F16G 1/10 474/205 |
| 2011/0129647 A1 | 6/2011 | Duke, Jr. et al. | | |
| 2012/0165145 A1 * | 6/2012 | Kitano | ................ | B65G 15/36 474/264 |
| 2014/0073468 A1 * | 3/2014 | Knutson | ................ | D02G 3/44 57/17 |
| 2014/0290387 A1 | 10/2014 | Shingai | | |
| 2014/0378256 A1 * | 12/2014 | Tamura | ................ | F16G 5/08 474/265 |
| 2015/0148163 A1 * | 5/2015 | Kusano | ................ | F16H 7/023 264/293 |
| 2015/0148165 A1 * | 5/2015 | Matsuda | ................ | F16G 1/21 474/264 |
| 2015/0219185 A1 * | 8/2015 | Matsuda | ................ | F16G 1/08 474/237 |
| 2015/0285335 A1 * | 10/2015 | Mitsutomi | ................ | F16G 5/06 156/137 |
| 2015/0369335 A1 * | 12/2015 | Ishiguro | ................ | C08L 7/00 474/260 |
| 2016/0040749 A1 * | 2/2016 | Kageyama | ................ | B32B 3/30 474/8 |
| 2016/0053851 A1 * | 2/2016 | Kojima | ................ | F16G 5/08 474/265 |
| 2017/0029578 A1 * | 2/2017 | Wu | ................ | F16G 1/10 |
| 2017/0037933 A1 * | 2/2017 | Takami | ................ | D06M 15/41 |
| 2017/0284504 A1 | 10/2017 | Mitsutomi et al. | | |
| 2018/0023663 A1 * | 1/2018 | Speer | ................ | F16G 5/20 474/261 |
| 2018/0313028 A1 | 11/2018 | Tomoda | | |
| 2018/0347109 A1 * | 12/2018 | Katagiri | ................ | D07B 1/0613 |
| 2019/0128372 A1 * | 5/2019 | Ishiguro | ................ | B32B 3/263 |
| 2019/0128373 A1 * | 5/2019 | Ishiguro | ................ | C09J 111/00 |
| 2019/0346014 A1 * | 11/2019 | Virtue | ................ | B32B 27/06 |
| 2020/0049230 A1 * | 2/2020 | Suzuki | ................ | F16G 1/10 |
| 2020/0232540 A1 * | 7/2020 | Ikegami | ................ | F16H 7/023 |
| 2021/0018063 A1 * | 1/2021 | Noborikawa | ........ | D03D 1/0094 |
| 2021/0222755 A1 * | 7/2021 | Tomoda | ................ | D02G 3/16 |

FOREIGN PATENT DOCUMENTS

| | | |
|---|---|---|
| JP | S61-192943 A | 8/1986 |
| JP | 2003-184959 A | 7/2003 |
| JP | 2004-535517 A | 11/2004 |
| JP | 2013-179666 A | 9/2013 |
| JP | 2016-070494 A | 5/2016 |
| JP | 2017-082377 A | 5/2017 |
| WO | 2009/153816 A1 | 12/2009 |
| WO | 2013-179666 A1 | 12/2013 |
| WO | 2014/004359 A1 | 1/2014 |
| WO | 2017-110790 A1 | 6/2017 |
| WO | WO-2018074471 A1 * | 4/2018 ............... D02G 3/28 |

OTHER PUBLICATIONS

Oct. 19, 2018—International Search Report—Intl App PCT/JP2018/025406.

Apr. 28, 2020—(JP) Notification of Reasons for Refusal—App 2018-122265.

* cited by examiner

V-RIBBED BELT

CROSS REFERENCE TO RELATED APPLICATIONS

This is a U.S. National Phase Application under 35 U.S.C. § 371 of International Application No. PCT/JP2018/025406, filed Jul. 4, 2018, which claims priority to Japanese Application Nos. 2017-130977, filed Jul. 4, 2017 and 2018-122265, filed Jun. 27, 2018, which was published Under PCT Article 21(2), the entire contents of which are incorporated herein by reference.

TECHNICAL FIELD

The present invention relates to a V-ribbed belt including a twisted cord including a carbon fiber as a core wire.

BACKGROUND ART

Recently, in the process of tightening of regulations about fuel economy of automobiles, more vehicles have been mounted with idling stop mechanisms as one of improvement measures of fuel economy in engines. A belt-type ISG (Integrated Starter Generator) drive for driving a crankshaft from an alternator through an accessory driving belt such as a V-ribbed belt is widely used for restarting an engine in an idling stop state. In the belt-type ISG drive, higher dynamic tension than that in a normal engine mounted with no ISG is generated in the accessory driving belt. For example, when the dynamic tension generated in an accessory driving belt in an engine mounted with no ISG is about 70 N/mm with respect to a belt width of 1 mm, a dynamic tension of about 100 N/mm is generated in an accessory driving belt in an engine mounted with a belt-type ISG drive. Therefore, an accessory driving belt for use in an engine mounted with a belt-type ISG drive is required to have a tensile elastic modulus high enough to keep the elongation of the belt small even in a case where high dynamic tension is generated. Conventionally, a twisted cord including a fiber having a comparatively high elastic modulus, such as a polyester fiber or an aramid fiber, has been used as a core wire of a V-ribbed belt used for accessory drive. However, the elastic modulus of the conventional belt is now insufficient due to continuous increase of dynamic tension. In order to cope with high dynamic tension, it is also considered to take a measure to increase the number of ribs (increase the belt width). However, when the number of ribs is increased, the pulley width is also increased, which is unfavorable from the viewpoint of space saving or weight reduction. That is, it is requested to provide a V-ribbed belt which has high durability in spite of a small number of ribs owing to the enhanced tensile elastic modulus of the belt.

To answer such a request, JP-A-S61-192943 (Patent Literature 1) discloses a power-transmission belt using a twisted-yarn cord of a carbon fiber as a tensile body. The literature suggests an effect that the use of the twisted-yarn cord of the carbon fiber improves the bending fatigue resistance to reduce the elongation of the belt during running.

However, as a means for improving the belt properties, the literature provides only a means for adjusting the twisted-yarn cord to have a secondary twist coefficient of 2 to 4 and applying Resorcin-Formalin-Latex (RFL) treatment thereto. It is therefore difficult to say that the belt according to Patent Literature 1 is satisfactorily optimized for the performance requested to a V-ribbed belt for accessory drive.

JP-T-2004-535517 (Patent Literature 2) discloses a belt including a tension member of a spiral cord including a yarn of a carbon fiber having a tensile elastic modulus within a range of about 50 to 350 GPa, as a power-transmission belt having an improved elongation resistance. The literature discloses a V-belt, a multi-ribbed belt and a toothed power-transmission belt as power-transmission belts. According to an example of the literature, the toothed power-transmission belt is manufactured using a carbon fiber cord of 396 tex.

However, the literature has no specific consideration about a V-ribbed belt. The toothed power-transmission belt which is specifically considered in the literature has a greatly different power-transmission mechanism from that of the V-ribbed belt. In addition, the literature regulates the tensile elastic modulus of a carbon fiber or a twisted cord, but does not provide any regulation about the tensile elastic modulus as the belt, and it cannot be estimated from the description of the literature. Even if a raw material or a cord having a high tensile elastic modulus is used, for example, when the number of cords in the belt is small, the tensile elastic modulus of the belt is reduced due to complicated interaction of other factors. Thus, the belt cannot be used for an application with a high dynamic tension. The tensile elastic modulus of the belt is important. Even if only the tensile elastic modulus of the carbon fiber or the twisted cord is regulated, the invention cannot be sufficiently specified as one for an application with a high dynamic tension.

CITATION LIST

Patent Literature

Patent Literature 1: JP-A-S61-192943 (claims)
Patent Literature 2: JP-T-2004-535517 (claim 1, paragraph [0005])

SUMMARY OF INVENTION

Technical Problem

An object of the present invention is to provide a V-ribbed belt which can transmit power with a narrow belt width and is excellent in durability even in an application such as an engine mounted with a belt-type ISG drive where high dynamic tension is generated.

Solution to Problem

As a result of intensive studies made by the present inventors, in order to attain the foregoing object, it has been found that when a core wire of a V-ribbed belt includes a twisted cord of a carbon fiber, the diameter of the core wire is adjusted to 0.6 to 1.2 mm, and the tensile elastic modulus of the belt is adjusted to 240 to 500 N/(mm·%), power can be transmitted with a narrow belt width and durability can be also improved even in an application such as an engine mounted with a belt-type ISG drive where high dynamic tension is generated.

That is, the V-ribbed belt according to the present invention is a V-ribbed belt including a twisted cord including a carbon fiber as a core wire, in which the belt has a tensile elastic modulus of 240 to 500 N/(mm·%), and the core wire has a core wire diameter of 0.6 to 1.2 mm. The V-ribbed belt according to the present invention may has a tensile strength of 620 N/mm or more per 1 mm width of the belt. A pitch of the core wire may be 0.1 to 0.5 mm larger than the core wire diameter. A total fineness of the core wire may be about 300 to 900 tex. The core wire may be a single-twisted yarn in which a plurality of carbon fiber filaments are arranged and then twisted in one direction, and a number of a twist may be 5 to 10 times/10 cm. The V-ribbed belt may include a compression rubber layer including staple fibers protruding from a surface thereof. In the V-ribbed belt according to the present invention, a number of ribs may be about 3 to 5. The V-ribbed belt according to the present invention may have an average width of about 7 to 22 mm. The V-ribbed belt according to the present invention may be a V-ribbed belt which is to be attached to an engine mounted with a belt-type ISG drive in which a dynamic tension per 1 mm width of the belt exceeds 85 N/mm. The V-ribbed belt according to the present invention may be a V-ribbed belt which is to be attached to an engine mounted with a belt-type ISG drive including a tensioner at a back surface of the belt, in which the V-ribbed belt includes a tension layer selected from the group consisting of a tension layer whose surface is covered with a cloth, a tension layer which includes staple fibers, and a tension layer whose surface is covered with a cloth and which includes staple fibers.

Advantageous Effects of Invention

According to the present invention, a core wire of a V-ribbed belt includes a twisted cord of a carbon fiber, the diameter of the core wire is adjusted to 0.6 to 1.2 mm, and a tensile elastic modulus of the belt is adjusted to 240 to 500 N/(mm·%). Thus, power can be transmitted with a narrow belt width and durability can be also improved even in an application such as an engine mounted with a belt-type ISG drive where high dynamic tension is generated.

DESCRIPTION OF EMBODIMENTS

An embodiment of the present invention will be described below by way of an example.
(Core Wire)
A V-ribbed belt according to the present invention includes a twisted cord of a carbon fiber as a core wire. According to the present invention, the twisted cord of the carbon fiber high in tensile elastic modulus is used as a core wire so that a reduced number of ribs can be applied to the V-ribbed belt. In addition, even when high dynamic tension is generated, elongation of the belt can be suppressed to improve the durability.
(Carbon Fiber)
Examples of the carbon fiber (carbon fiber) as a raw yarn forming the twisted cord include a pitch-based carbon fiber, a polyacrylonitrile (PAN)-based carbon fiber, a phenolic resin-based carbon fiber, a cellulose-based carbon fiber, and a polyvinyl alcohol-based carbon fiber. As commercial products of such carbon fibers, for example, "TORAYCA (registered trademark)" manufactured by Toray Industries, Inc., "TENAX (registered trademark)" manufactured by Toho Tenax Co., Ltd., "DIALEAD (registered trademark)" manufactured by Mitsubishi Chemical Corporation, etc. can be used. Each of those carbon fibers may be used alone, or two or more kinds of them may be used in combination. Of those carbon fibers, the pitch-based carbon fiber and the PAN-based carbon fiber are preferred, and the PAN-based carbon fiber is particularly preferred.

The carbon fiber as a raw yarn is typically a carbon multifilament yarn including monofilament yarns of the carbon fiber. The carbon multifilament yarn includes monofilament yarns of the carbon fiber. If necessary, the carbon multifilament yarn may include monofilament yarns of fibers (an inorganic fiber such as a glass fiber, an organic fiber such as an aramid fiber, etc.) other than the carbon fiber. The ratio of the carbon fiber is 50 mass % or higher (50 to 100 mass %) in the total of the monofilament yarns (multifilament yarn). The ratio of the carbon fiber is preferably 80 mass % or higher, more preferably 90 mass % or higher, and typically 100 mass %. That is, all the monofilament yarns are typically made of the carbon fiber. When the ratio of the carbon fiber is too low, there is a concern that the elongation of the belt may be so large that the durability may deteriorate if high dynamic tension is generated.

The multifilament yarn includes a plurality of monofilament yarns. For example, the multifilament yarn may include about 100 to 50,000 monofilament yarns, preferably about 1,000 to 30,000 monofilament yarns, and more preferably about 5,000 to 20,000 (particularly 10,000 to 15,000) monofilament yarns. The average fineness of the monofilament yarns may be, for example, about 0.1 to 5 dtex, preferably about 0.3 to 3 dtex, and more preferably about 0.5 to 1 dtex.

The tensile elastic modulus of the carbon fiber (the carbon fiber which has not been twisted yet) as a raw yarn is, for example, about 200 to 900 GPa, preferably about 200 to 800 GPa, and more preferably about 210 to 500 GPa (particularly 220 to 300 GPa). When the tensile elastic modulus of the carbon fiber is too low, there is a concern that the elongation of the belt may increase to increase slippage, causing failure in power transmission, occurrence of abnormal noise, and deterioration of durability due to heat generation. On the contrary, when the tensile elastic modulus is too high, there is a concern that fluctuation of tension in the belt may increase to reduce the durability.

Incidentally, in the present description and claims, the tensile elastic modulus of a fiber can be measured by a method in which a load-elongation curve is measured by a method described in JIS L1013 (2010), and then an average inclination thereof in a region where a load is 1,000 MPa or less is obtained.

The tensile strength of the carbon fiber as a raw yarn is, for example, about 2,000 to 7,000 MPa, preferably about 2,500 to 6,500 MPa, and more preferably about 3,000 to 6,000 MPa (particularly 4,000 to 5,000 MPa). When the tensile strength of the carbon fiber is too low, there is a concern that the belt may be cut off when high dynamic tension is applied thereto. On the contrary, when the tensile strength is too high, there is a concern that the bending fatigue resistance may deteriorate.

Incidentally, in the present description and claims, the tensile strength can be measured by a method described in JIS L1013 (2010). As described in this standard, the tensile strength of the multifilament which has not been twisted is measured with eight times of twist per 10 cm.
(Properties of Core Wire)
The average wire diameter (core wire diameter) of the core wire is 0.6 to 1.2 mm, preferably about 0.7 to 1.2 mm, and more preferably about 0.75 to 1.15 mm (particularly 1 to 1.15 mm). When the core wire diameter is smaller than 0.6 mm, there is a concern that the tensile elastic modulus of the belt may be lowered. When the core wire diameter is larger than 1.2 mm, there is a concern that the bending fatigue resistance of the belt may deteriorate. In the present description and claims, the average wire diameter (core wire diameter) of the core wire can be measured by photographing a section in the belt width direction with a scanning electron microscope (SEM) or by observing the section with a projector. The average wire diameter can be obtained as an average value of lengths of core wires in the width direction of the belt measured at arbitrary 10 places. Incidentally, when the number of core wires included in the belt is too small to measure the lengths at 10 places, all the parts which can be measured are measured to obtain the average value.

The total fineness of the core wire (the twisted cord of the carbon fiber) can be selected within a range where a desired core wire diameter can be obtained. The total fineness is, for example, about 200 to 1,000 tex, preferably about 300 to 900 tex, and more preferably about 350 to 850 tex. Particularly in an application where large dynamic tension is generated, the total fineness may be, for example, about 500 to 1,000 tex, preferably about 600 to 950 tex, and more preferably about 700 to 900 tex. When the total fineness of the core wire is adjusted to be within such a range, the core wire diameter can be controlled to be within a proper range so that the tensile elastic modulus of the belt can be enhanced satisfactorily. When the total fineness is too small, there is a concern that the core wire diameter is so narrow that the tensile elastic modulus or the tensile strength of the belt may deteriorate. When the total fineness is too large, there is a concern that the core wire diameter is so thick that the bending fatigue resistance may deteriorate.

The twisted cord forming the core wire may be a Lang's lay in which a plurality of primary-twisted yarns are collected and twisted in the same direction as the direction of the primary twisting, an organzine in which a plurality of primary-twisted yarns are collected and twisted in an opposite direction to the direction of the primary twisting, or a single twist in which a bundle of twistless fibers are collected and twisted in one direction. Further, secondary twisting may be performed in addition to primary twisting and final twisting. Of those twists, the single twist is preferred because it can simplify the process and is excellent in productivity. The single-twisted cord may be a single-twisted yarn in which a plurality of carbon fiber filaments are arranged and then twisted in one direction.

When the core wire is a single twist, the number of twist in the single-twisted cord can be selected from a range of about 3 to 12 times/10 cm. The number of twist is preferably about 5 to 10 times/10 cm, and more preferably about 5.5 to 9 times/10 cm (particularly 5.5 to 7 times/10 cm). When the number of twist in the single-twisted cord is adjusted within the aforementioned range, the elongation can be reduced while keeping the bending fatigue resistance of the core wire. When the number of twist in the single-twisted cord is too small, there is a concern that the bending fatigue resistance is so insufficient that the durability of the belt may deteriorate. On the contrary, when the number of twist is too large, the belt is indeed excellent in bending fatigue resistance, but there is a concern that the tensile elastic modulus or the tensile strength may be lowered, and the elongation may increase.

The core wire may be subjected to a bonding treatment (or surface treatment) used commonly. For example, the core wire may be treated with Resorcin-Formalin-Latex (RFL) liquid or treatment liquid containing a polyisocyanate compound. Further, the core wire may be coated with a rubber composition containing a rubber component forming an adhesion rubber layer which will be described later.

(Core Wire Pitch)

A plurality of core wires are buried in the V-ribbed belt (for example, in the adhesion rubber layer as will be described later). The plurality of core wires are disposed to extend in the longitudinal direction of the belt and to be separated from one another at a predetermined pitch in the width direction of the belt.

It is preferable that the core wire pitch in the V-ribbed belt (the distance between centers of two core wires adjacent to each other in the belt) is smaller because the tensile strength and the tensile elastic modulus of the belt can be enhanced. However, when the core wire pitch is made too small, there may occur a problem that each core wire tends to ride on another core wire adjacent thereto or rubber hardly flows between the core wires to thereby reduce the adhesive force. In addition, there is a concern that the core wires may contact and rub each other to thereby deteriorate the bending fatigue resistance when the belt is, for example, bent. Furthermore, when the core wires are wound spirally, there is also a concern that the core wires adjacent to each other may overlap each other to thereby deteriorate the workability. Therefore, although the core wire pitch is allowed to be not smaller than the core wire diameter, it is desirable that the core wire pitch is only a little larger than the core wire diameter in order to improve the workability.

Specifically, the core wire pitch (average pitch) can be selected from a range about 0.01 to 1 mm larger than the core wire diameter. The core wire pitch may be preferably about 0.05 to 0.8 mm (for example, 0.1 to 0.5 mm) larger than the core wire diameter, and more preferably about 0.2 to 0.4 mm (particularly 0.2 to 0.3 mm) larger than the core wire diameter. When the core wire pitch is too small, there may occur a problem that each core wire rubs on another core wire to deteriorate the belt strength when the belt is bent, or each core wire rides on another core wire when the belt is manufactured. On the contrary, when the core wire pitch is too large, there is a concern that the tensile elastic modulus of the belt may be reduced even if a carbon fiber high in tensile elastic modulus is used.

In the present description and claims, the core wire pitch (average pitch) can be measured by photographing a section in the width direction of the belt with an SEM or by observing the section with a projector. The core wire pitch can be obtained as an average value of distances between centers of core wires measured at arbitrary 10 places. Incidentally, when the number of core wires included in the belt is too small to measure the distances at 10 places, all the parts which can be measured are measured to obtain the average value.

(V-Ribbed Belt)

Figure 1:
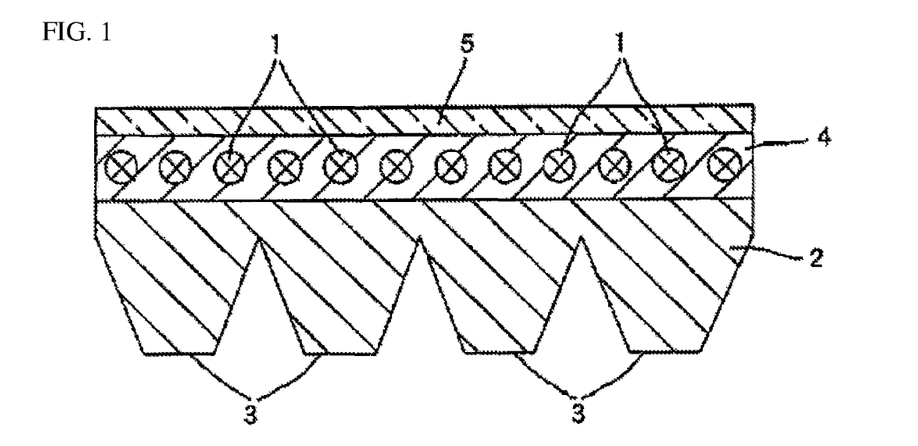
FIG. 1 is a schematic sectional view showing an example of a V-ribbed belt according to the present invention.

The V-ribbed belt according to the present invention includes a core wire including the aforementioned twisted cord. The form of the V-ribbed belt according to the present invention is not particularly limited as long as it includes a plurality of V-rib portions extending in parallel with one another along the longitudinal direction of the belt. An example of the form is shown in FIG. 1. FIG. 1 is a schematic sectional view showing an example of the V-ribbed belt according to the present invention. The V-ribbed belt shown in FIG. 1 has a form in which a compression rubber layer 2, an adhesion rubber layer 4 having core wires 1 buried in the longitudinal direction of the belt, and a tension layer 5 including a cover fabric (woven fabric, knitted fabric, nonwoven fabric, etc.) or a rubber composition are disposed sequentially from the belt bottom (inner circumferential surface) toward the belt top (back surface). A plurality of sectionally V-shaped grooves extending in the longitudinal direction of the belt are formed in the compression rubber layer 2. A plurality of V-rib portions 3 (four portions in the example shown in FIG. 1) each having a V-shape (inverted trapezoidal shape) in section are formed between the grooves. Two slopes (surfaces) of each V-rib portion 3 form friction power-transmission faces, which contact with a pulley to transmit (frictionally transmit) power. Inside the adhesion rubber layer 4, a plurality of core wires 1 are disposed to extend in the longitudinal direction of the belt and to be separated from one another at a predetermined pitch in the width direction of the belt.

The V-ribbed belt according to the present invention is not limited to the form. The V-ribbed belt is provided with a compression rubber layer having a power-transmission face at least a part of which can contact a V-rib groove portion (V-groove portion) of a pulley. Typically the V-ribbed belt has a tension layer, a compression rubber layer, and core wires buried therebetween along the longitudinal direction of the belt. In the V-ribbed belt according to the present invention, for example, the core wires 1 may be buried between the tension layer 5 and the compression rubber layer 2 without providing the adhesion rubber layer 4. The V-ribbed belt may have a form in which the adhesion rubber layer 4 is provided to either the compression rubber layer 2 or the tension layer 5, and the core wires 1 are buried between the adhesion rubber layer 4 (the compression rubber layer 2 side) and the tension layer 5 or between the adhesion rubber layer 4 (the tension layer 5 side) and the compression rubber layer 2.

At least the compression rubber layer 2 includes a rubber composition which will be described below in detail. The adhesion rubber layer 4 includes a rubber composition which is commonly used as an adhesion rubber layer. The tension layer 5 includes a cover fabric or a rubber composition which is commonly used as a tension layer. The tension layer 5 does not have to include the same rubber composition as the compression rubber layer 2.

In the V-ribbed belt according to the present invention, the number of V-ribs (rib number) is four in FIG. 1, but may be selected from a range of about 2 to 6. The present invention is greatly characterized in that the durability of the belt can be improved with a small number of ribs. The number of ribs is preferably 3 to 5, and particularly preferably 4. According to the present invention, the number of ribs is set to as small as about 3 to 5, so that a request to save the space or reduce the weight can be satisfied. When the number of ribs is too small, there is a concern that the tensile elastic modulus or the tensile strength may be insufficient even if a carbon fiber is used. On the contrary, when the number of ribs is too large, there is a concern that the request to save the space or reduce the weight cannot be sufficiently satisfied.

According to the present invention, the durability of the belt can be improved with a small number of ribs. Therefore, the belt width may be narrow. The width (average width) of the V-ribbed belt according to the present invention is, for example, about 7 to 22 mm, preferably about 10 to 18 mm, and more preferably about 12 to 16 mm.

The V-ribbed belt according to the present invention is suitable for an application where high dynamic tension is generated. For example, in an engine mounted with a belt-type ISG drive, the engine is often started repeatedly to generate high dynamic tension in a belt. Therefore, the V-ribbed belt according to the present invention is required to have higher tensile strength than usual. In such an application, the tensile strength of the V-ribbed belt may be 420 N/mm or more (for example, 420 to 1,000 N/mm) as a value per 1 mm width of the belt. The tensile strength may be preferably 560 N/mm or more, and more preferably 620 N/mm or more (for example, 620 to 850 N/mm, particularly 680 N/mm or more). In an application where especially high dynamic tension is generated, the tensile strength may be preferably 750 to 1,000 N/mm (particularly 800 to 900 N/mm). When the tensile strength of the belt is adjusted within such a range, the belt can show enough durability not to be cut off even if high dynamic tension is applied to the belt.

The tensile elastic modulus of the V-ribbed belt according to the present invention is 240 to 500 N/(mm·%), preferably about 300 to 480 N/(mm·%), and more preferably about 400 to 470 N/(mm·%) (particularly 420 to 450 N/(mm·%)). When the tensile elastic modulus of the belt is lower than 240 N/(mm·%), there is a concern that the elongation of the belt may increase to increase slippage, causing failure in power transmission, occurrence of abnormal noise, and deterioration in durability due to heat generation. When the tensile elastic modulus of the belt exceeds 500 N/(mm·%), there is a concern that the fluctuation of the tension in the belt may increase to deteriorate the durability.

Incidentally, in the present description and claims, the tensile strength and the tensile elastic modulus of the V-ribbed belt can be measured by a method described in Examples which will be described later.

The engine mounted with a belt-type ISG drive to which the V-ribbed belt according to the present invention is suitably applied may be, for example, an engine mounted with a belt-type ISG drive in which dynamic tension per 1 mm width of the belt exceeds 85 N/mm (for example, about 90 to 120 N/mm). Under such severe conditions, the V-ribbed belt according to the present invention can show its own advantageous effect. The engine mounted with a belt-type ISG drive may be an engine mounted with a belt-type ISG drive including a tensioner at the back surface of the belt.

(Rubber Composition)

The compression rubber layer 2, the adhesion rubber layer 4 and the tension layer 5 may include rubber compositions containing rubber components. Particularly when the compression rubber layer includes a rubber composition, excellent calmness and power transmission performance can be provided. Further, when the compression rubber layer and the adhesion rubber layer include a rubber composition, bonding with core wires can be performed by use of an existing method.

Vulcanizable or crosslinkable rubber may be used as a rubber component. Examples of such rubber components include diene-based rubber (natural rubber, isoprene rubber, butadiene rubber, chloroprene rubber, styrene-butadiene rubber (SBR), acrylonitrile-butadiene rubber (nitrile rubber), hydrogenated nitrile rubber, etc.), ethylene-α-olefin elastomer, chlorosulfonated polyethylene rubber, alkylated chlorosulfonated polyethylene rubber, epichlorohydrin rubber, acrylic rubber, silicone rubber, urethane rubber, and fluororubber. Each of those rubber components may be used alone, or two or more kinds of them may be used in combination. The ethylene-α-olefin elastomer (ethylene-propylene copolymer (EPM), ethylene-propylene-diene terpolymer (EPDM), etc.) and the chloroprene rubber are preferred rubber components. Further, the ethylene-α-olefin elastomer (ethylene-propylene copolymer (EPM), ethylene-propylene-diene terpolymer (EPDM), etc.) is particularly preferred because it has ozone resistance, heat resistance, cold resistance and weather resistance and the weight of the belt can be reduced. When the rubber component includes the ethylene-α-olefin elastomer, the ratio of the ethylene-α-olefin elastomer in the rubber component may be 50 mass % or higher (particularly about 80 to 100 mass %), and particularly preferably 100 mass % (only the ethylene-α-olefin elastomer).

The rubber composition may further include a staple fiber. Examples of such staple fibers include a synthetic fiber such as a polyolefin-based fiber (a polyethylene fiber, a polypropylene fiber, etc.), polyamide fiber (a polyamide-6 fiber, a polyamide-66 fiber, a polyamide 46 fiber, an aramid fiber, etc.), a polyalkylene arylate-based fiber (a $C_{2-4}$ alkylene $C_{8-14}$ arylate-based fiber such as a polyethylene terephthalate (PET) fiber, a polytrimethylene terephthalate (PTT) fiber, polybutylene terephthalate (PBT) fiber, and a polyethylene naphthalate (PEN) fiber, etc.), a vinylon fiber, a polyvinyl alcohol-based fiber, and a poly-para-phenylene benzobisoxazole (PBO) fiber; a natural fiber such as cotton, hemp, and wool; and an inorganic fiber such as a carbon fiber. Each of those staple fibers may be used alone, or two or more kinds of them may be used in combination. The staple fiber may be subjected to a bonding treatment (or surface treatment) used commonly, in the same manner as the core wires, in order to improve dispersibility and adhesiveness in the rubber composition.

Particularly the V-ribbed belt according to the present invention is applied to an application where high dynamic tension is generated. Therefore, it is preferable that the compression rubber layer and the tension layer include staple fibers in order to suppress the abrasion of the rubber and to improve the durability, against high dynamic tension. Particularly it is preferable that the staple fibers protrude from the surfaces of the compression rubber layer and the tension layer (particularly the compression rubber layer). As a method for making the staple fibers protrude from the surface of the compression rubber layer, a method for burying the staple fibers into the compression rubber layer in a state where the staple fibers protrude from the surface of the compression rubber layer, a method for planting the staple fibers into the surface of the compression rubber layer, etc. may be exemplified.

The rubber composition may further include additives used commonly. Examples of the commonly used additives include a vulcanizing agent or a crosslinking agent (or a crosslinking agent based additive) (a sulfur-based vulcanizing agent or the like), a co-crosslinking agent (bismaleimides, etc.), a vulcanization aid or a vulcanization accelerator (a thiuram-based accelerator or the like), a vulcanization retarder, metal oxide (zinc oxide, magnesium oxide, calcium oxide, barium oxide, iron oxide, copper oxide, titanium oxide, aluminum oxide, etc.), a reinforcing agent (e.g. carbon black, silicon oxide such as water-containing silica), a filler (clay, calcium carbonate, talc, mica, etc.), a softening agent (e.g. oils such as paraffin oil and naphthenic oil), a processing agent or a processing aid (stearic acid, metal salt of stearic acid, wax, paraffin, fatty acid amide, etc.), an anti-aging agent (an antioxidant, an anti-heat aging agent, a bending-crack inhibitor, an ozone-deterioration inhibitor, etc.), a coloring agent, a tackifier, a plasticizer, a coupling agent (a silane coupling agent), a stabilizer (an ultraviolet absorber, a heat stabilizer, etc.), a flame retardant, and an antistatic agent. Each of those additives may be used alone, or two or more kinds of them may be used in combination. The metal oxide may act as a crosslinking agent. Particularly the rubber composition forming the adhesion rubber layer 4 may contain an adhesiveness improver (resorcin-formaldehyde co-condensate, amino resin, etc.).

The rubber compositions forming the compression rubber layer 2, the adhesion rubber layer 4 and the tension layer 5 may be the same as one another or may be different from one another. In the same manner, the staple fibers contained in the compression rubber layer 2, the adhesion rubber layer 4 and the tension layer 5 may be the same as one another or may be different from one another.

(Cover Fabric)

The tension layer 5 may include a cover fabric. The cover fabric can be, for example, formed of a fabric material (preferably woven fabric) such as woven fabric, wide-angle fabric, knitted fabric, and nonwoven fabric. If necessary, a bonding treatment such as a treatment with RFL liquid (such as immersion treatment) or friction for rubbing adhesion rubber into the fabric material is performed, or the adhesion rubber and the fabric material are laminated (coated) on each other and then disposed on the compression rubber layer and/or the adhesion rubber layer in the aforementioned form.

In addition, the tension layer 5 may be a tension layer in which a surface of a rubber layer is covered with cloth (such as the cover fabric). Such a tension layer is preferably applied to an engine mounted with a belt-type ISG drive including a tensioner at the back surface of the belt. As the tension layer to be applied to the engine mounted with a belt-type ISG drive including a tensioner, a tension layer which includes a staple fiber or a tension layer whose surface is covered with cloth and which includes a staple fiber is also preferable as well as the tension layer whose surface is covered with fabric. When such a tension layer is applied, it is possible to improve the durability even in the belt-type ISG drive including a tensioner in which abrasion resistance is also required in the tension rubber layer.

(Method for Manufacturing V-Ribbed Belt)

A method for manufacturing the V-ribbed belt according to the present invention is not particularly limited, but a known or common method can be used. For example, the compression rubber layer 2, the adhesion rubber layer 4 having the core wires 1 buried therein, and the tension layer 5 are formed of unvulcanized rubber compositions respectively and laminated. The laminate is shaped into a cylindrical shape by a shaping die, and vulcanized to be shaped into a sleeve. The vulcanized sleeve is cut into a predetermined width. Thus, the V-ribbed belt can be formed. More in detail, the V-ribbed belt can be, for example, manufactured by the following method.

(First Manufacturing Method)

First, a sheet for a tension layer is wound around a cylindrical shaping mold (mold or shaping die) having a smooth surface. A core wire (twisted cord) forming a core body is wound spirally on the sheet. Further, a sheet for an adhesion rubber layer and a sheet for a compression rubber layer are wound sequentially to produce a formed body. After that, the shaping mold with the formed body is covered with a vulcanizing jacket, and then put into a vulcanizer to perform vulcanization under predetermined vulcanizing conditions. After that, the molded body is released from the shaping mold to obtain a cylindrical vulcanized rubber sleeve. The external surface (compression rubber layer) of the vulcanized rubber sleeve is ground with a grinding wheel to form a plurality of ribs. The vulcanized rubber sleeve is then cut in the longitudinal direction of the belt with a predetermined width by a cutter to thereby obtain a V-ribbed belt. By reversing the cut belt, it is possible to obtain a V-ribbed belt provided with a compression rubber layer having rib portions in an inner circumferential surface thereof.

(Second Manufacturing Method)

First, using a cylindrical inner mold including a flexible jacket on an outer circumferential surface as an inner mold, a sheet for a tension layer is wound around the flexible jacket on the outer circumferential surface of the inner mold. A core wire forming a core body is wound spirally on the sheet. Further, a sheet for a compression rubber layer is wound to produce a laminate. Next, a cylindrical outer mold provided with a plurality of rib molds in an inner circumferential surface thereof is used as an outer mold which can be attached to the inner mold, and the inner mold on which the laminate has been wound is disposed concentrically within the outer mold. After that, the flexible jacket is expanded toward the inner circumferential surface (rib molds) of the outer mold, and the laminate (compression rubber layer) is pressed into the rib molds and vulcanized. The inner mold is taken out from the outer mold, and a vulcanized rubber sleeve with a plurality of ribs is released from the outer mold. The vulcanized rubber sleeve is then cut in the longitudinal direction of the belt with a predetermined width by a cutter to thereby obtain a V-ribbed belt. According to the second manufacturing method, the laminate including the tension layer, the core body and the compression rubber layer can be expanded at one time to thereby obtain a sleeve (or a V-ribbed belt) having a plurality of ribs.

(Third Manufacturing Method)

As for the second manufacturing method, for example, a method disclosed in JP-A-2004-82702 (a method in which only a compression rubber layer is expanded to form a preliminary molded body (semi-vulcanized state), and next a tension layer and a core body are expanded to be pressed and attached onto the preliminary molded body so as to be vulcanized and integrated, thereby obtaining a V-ribbed belt) may be used.

EXAMPLES

The present invention will be described below more in detail based on Examples. However, the present invention is not limited to those Examples. The details of raw materials used in Examples and evaluating methods for measured evaluation items will be shown below.

(Raw Materials)

(Twisted Cord)

Carbon 1: carbon fiber "TORAYCA (registered trademark) T400HB-6000" manufactured by Toray Industries, Inc., tensile elastic modulus 230 GPa, single yarn fineness 0.67 dtex, number of filaments 6,000, total fineness 400 tex, Carbon 2: carbon fiber "TORAYCA (registered trademark) T700SC-12000" manufactured by Toray Industries, Inc., tensile elastic modulus 230 GPa, single yarn fineness 0.67 dtex, number of filaments 12,000, total fineness 800 tex, Carbon 3: carbon fiber "TORAYCA (registered trademark) T400HB-3000" manufactured by Toray Industries, Inc., tensile elastic modulus 230 GPa, single yarn fineness 0.67 dtex, number of filaments 3,000, total fineness 200 tex, PET: polyethylene terephthalate fiber "IBTORON (registered trademark) P952NL" manufactured by Teijin Limited, tensile elastic modulus 13 GPa, single yarn fineness 4.4 dtex, Aramid: para-aramid fiber "TECHNORA (registered trademark) T200" manufactured by Teijin Limited, tensile elastic modulus 74 GPa, single yarn fineness 1.7 dtex.

(Twisted Cord Treatment Liquid)

Pre-dip treatment liquid: toluene solution containing 10 mass % of polymeric isocyanate ("MILLIONATE (registered trademark) MR-200" manufactured by Tosoh Corporation, NCO content 30%), Resorcin-Formalin-Latex (RFL) treatment liquid: mixture liquid containing 4 parts by mass of prepolymer of resorcin and formalin (2.6 parts by mass of resorcin and 1.4 parts by mass of formalin), 17.2 parts by mass of latex (styrene-butadiene-vinyl pyridine copolymer, manufactured by Zeon Corporation), and 78.8 parts by mass of water, Overcoat treatment liquid: mixture liquid containing 9.3 parts by mass of a rubber composition for an adhesion rubber layer shown in Table 1, 0.7 parts by mass of polymeric isocyanate, and 90 parts by mass of toluene.

(Raw Materials Forming Belt)

EPDM: "IP3640" manufactured by DuPont Dow Elastomers Japan K.K., Mooney viscosity 40 (100° C.), Carbon black HAF: "SEAST 3" manufactured by Tokai Carbon Co., Ltd., Water-containing silica: "Nipsil VN3" manufactured by Tosoh Silica Corporation, BET specific area 240 m$^2$/g, Resorcin-formaldehyde condensate: resorcinol lower than 20%, formalin lower than 0.1%, Anti-aging agent: "NONFLEX OD3" manufactured by Seiko Chemical Co., Ltd., Vulcanization accelerator DM: di-2-benzothiazole disulfide, Polyamide staple fiber: "66-NYLON" manufactured by Asahi Kasei Corporation, Paraffin-based softener: "DIANA PROCESS OIL" manufactured by Idemitsu Kosan Co., Ltd., Organic peroxide: "PERKADOX 14RP" manufactured by KAYAKU AKZO CO., LTD.

(Tensile Strength)

The obtained V-ribbed belt was pulled under the conditions of a pulling rate of 50 mm/min and a test temperature of 23° C. by use of a universal testing machine ("UH-200kNX" manufactured by Shimadzu Corporation) to thereby measure the strength at the breaking time of the V-ribbed belt.

(Tensile Elastic Modulus)

The central positions of a pair of flat pulleys (diameter of 75 mm) disposed vertically were matched in advance, and the matched position was regarded as an origin. Next, the belt was wound on the pair of flat pulleys such that the back surface side of the belt abutted against the flat pulleys. One of the flat pulleys was moved to apply tension (about 14 N/mm) so as not to loosen the belt. The position of the flat pulley in this state was regarded as an initial position. The belt was pulled at a rate of 50 mm/min. As soon as the stress of the belt reached 170 N/mm, the flat pulley was returned to the initial position. This operation was repeated twice. In a stress-strain curve of the second operation, an inclination (average inclination) of a straight line in an area (85-140 N/mm) having a comparatively linear relationship was calculated as the tensile elastic modulus of the belt.

(Durability Running Test (Running Life))

Figure 2:
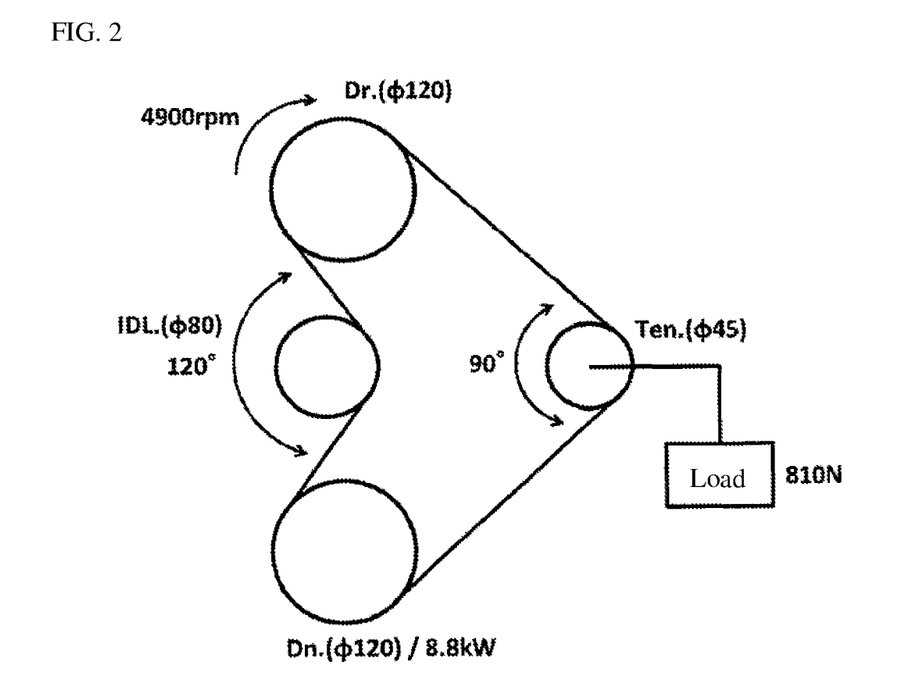
FIG. 2 is a schematic view showing a testing machine for evaluating a durability running test on V-ribbed belts obtained in Examples and Comparative Examples.

Durability running test was performed by use of a testing machine having a layout shown in FIG. 2, in which a driving pulley (Dr.) having a diameter of 120 mm, a tension pulley (Ten.) having a diameter of 45 mm, a driven pulley (Dn.) having a diameter 120 mm, and an idler pulley (IDL.) having a diameter of 80 mm were disposed in order. The V-ribbed belt was suspended on the each pulley of the testing machine, and driven to run under the following conditions. That is, the rotating speed of the driving pulley was 4,900 rpm, the belt was wound on the idler pulley at a winding angle of 120°, the belt was wound on the tension pulley at a winding angle of 90°, a load on the driven pulley was 8.8 kW, a fixed load (810 N) was given to the belt, and an atmospheric temperature was 120° C. Then the belt was made to run up to 300 hours. When the belt did not break down before 300 hours, the belt was determined to have a running life of 300 hours or more. When the belt broke down before 300 hours, the breaking time was determined as the life thereof, and the test was ceased.

(Remaining Tensile Strength)

As for each of Examples 1 to 3 and 7 showing the life of 300 hours or more in the durability running test, the tensile strength of the V-ribbed belt after the durability running test was measured. The measuring method was the same as the method for measuring the tensile strength before the durability running test. That is, the V-ribbed belt was pulled under the conditions of a pulling rate of 50 mm/min and a test temperature of 23° C. by use of a universal testing machine ("UH-200kNX" manufactured by Shimadzu Corporation) to thereby measure the strength at the breaking time of the V-ribbed belt after the running test.

Example 1

(Preparing Core Wire)

As a core wire, a bundle of carbon fibers (carbon 1) having a total fineness of 400 tex was single-twisted at the number of twist of 8 times/10 cm to thereby prepare a single-twisted cord (S-twist, Z-twist). The single-twisted cord obtained thus was immersed into a pre-dip treatment liquid (25° C.) for 10 seconds, and then subjected to heat treatment at 180° C. for 4 minutes. Next, the single-twisted cord subjected to the pre-dip treatment was immersed into an RFL treatment liquid (25° C.) for 10 seconds, and then subjected to heat treatment at 230° C. for 2 minutes. Further, the single-twisted cord subjected to the RFL treatment was immersed into an overcoat treatment liquid (25° C.) for 3 seconds, and then subjected to heat treatment at 150° C. for 4 minutes. Thus, a treated cord (core wire diameter of 0.8 mm) coated with adhesion rubber was obtained.

(Preparing V-Ribbed Belt)

First, a single ply (single layer) of cotton fabric with rubber was wound around the outer circumference of a cylindrical shaping mold having a smooth surface, and an unvulcanized sheet for an adhesion rubber layer, which was formed of a rubber composition shown in Table 1, was wound around the outside of the cotton fabric. Next, two treated cords (S-twist and Z-twist) were wound spirally on the sheet for the adhesion rubber layer in the state where the S-twist treated cord and the Z-twist treated cord were arranged in parallel at a pitch of 1.0 mm. Further, an unvulcanized sheet for an adhesion rubber layer which was formed of the rubber composition and an unvulcanized sheet for a compression rubber layer which was formed of a rubber composition shown in Table 2 were wound sequentially thereon. In the state where a vulcanizing jacket was disposed outside the sheet for the compression rubber layer, the shaping mold was put into a vulcanizer, and vulcanized. A cylindrical vulcanized rubber sleeve obtained by the vulcanization was released from the shaping mold. The compression rubber layer of the vulcanized rubber sleeve was ground with a grinder to form a plurality of V-shaped grooves concurrently. The vulcanized rubber sleeve was then cut circumferentially in a round slice by a cutter. Thus, a V-ribbed belt having three ribs formed therein and having a circumferential length of 1,100 mm and an average width of 10.7 mm was obtained. In the obtained belt, the S-twist treated cord and the Z-twist treated cord were arranged alternately in parallel in a sectional view in the direction shown in FIG. 1.

TABLE 1

(composition for adhesion rubber layer)

| components | parts by mass |
|---|---|
| EPDM | 100 |
| stearic acid | 1 |
| zinc oxide | 5 |
| carbon HAF | 35 |
| water-containing silica | 20 |
| resorcin-formaldehyde condensate | 2 |
| anti-aging agent | 2 |
| vulcanization accelerator DM | 2 |
| hexamethoxy methylol melamine | 2 |
| sulfur | 1 |
| total | 170 |

TABLE 2

(composition for compression rubber layer)

| components | parts by mass |
|---|---|
| EPDM | 100 |
| polyamide staple fiber | 15 |
| cotton staple fiber | 25 |
| zinc oxide | 5 |
| stearic acid | 1 |
| mercaptobenzimidazole | 1 |
| carbon HAF | 60 |
| paraffin-based softener | 10 |
| organic peroxide | 4 |
| dibenzoyl-quinone dioxime | 2 |
| total | 223 |

Example 2

In the preparation of a core wire, a treated cord (core wire diameter of 1.1 mm) was prepared in the same manner as in Example 1 except that a bundle of carbon fibers (Carbon 2) having a total fineness of 800 tex was single-twisted at the number of twist of 6 times/10 cm to obtain a single-twisted cord. A V-ribbed belt was obtained in the same manner as in Example 1, except that the pitch of the treated cord was changed to 1.5 mm in the preparation of the V-ribbed belt.

Example 3

A V-ribbed belt was obtained in the same manner as in Example 2, except that the pitch of the treated cord was changed to 1.3 mm in the preparation of the V-ribbed belt.

Example 4

In the preparation of a core wire, a treated cord was prepared in the same manner as in Example 1 except that the number of twist was changed to 10 times/10 cm. A V-ribbed belt was obtained in the same manner as in Example 1.

Example 5

In the preparation of a core wire, a treated cord was prepared in the same manner as in Example 1 except that the number of twist was changed to 12 times/10 cm. A V-ribbed belt was obtained in the same manner as in Example 1.

Example 6

In the preparation of a core wire, a treated cord was prepared in the same manner as in Example 3 except that the number of twist was changed to 4 times/10 cm. A V-ribbed belt was obtained in the same manner as in Example 3.

Example 7

A V-ribbed belt was obtained in the same manner as in Example 4, except that the pitch of the treated cord was changed to 0.8 mm in the preparation of the V-ribbed belt.

Comparative Example 1

In the preparation of a core wire, a treated cord (core wire diameter of 1.0 mm) was prepared in the same manner as in Example 1 except that two bundles of polyester fibers (PET) having a fineness of 122 tex were collected and primarily twisted at the number of twist of 21 times/10 cm, and such three primary-twisted yarns were collected and twisted by organzine at the number of twist of 11 times/10 cm to thereby prepare an organzine cord having a total fineness of 730 tex. A V-ribbed belt was obtained in the same manner as in Example 1, except that the pitch of the treated cord was changed to 1.1 mm in the preparation of the V-ribbed belt.

Comparative Example 2

In the preparation of a core wire, a treated cord (core wire diameter of 0.7 mm) was prepared in the same manner as in Example 1 except that a bundle of para-aramid fibers (aramid) having a fineness of 167 tex was primarily twisted at the number of twist of 4 times/10 cm, and such two primary-twisted yarns were collected and twisted by Lang's lay at the number of twist of 13 times/10 cm to thereby prepare a Lang's lay cord having a total fineness of 330 tex. A V-ribbed belt was obtained in the same manner as in Example 1, except that the pitch of the treated cord was changed to 0.9 mm in the preparation of the V-ribbed belt.

Comparative Example 3

In the preparation of a core wire, a treated cord (core wire diameter of 0.5 mm) was prepared in the same manner as in Example 1 except that a bundle of carbon fibers (Carbon 3) having a total fineness of 200 tex was single-twisted to prepare a single-twisted cord as a core wire. A V-ribbed belt was obtained in the same manner as in Example 1.

Table 3 shows evaluation results of the V-ribbed belts obtained in Examples and Comparative Examples.

TABLE 3

| | Examples | | | | | | | Comparative Examples | | |
|---|---|---|---|---|---|---|---|---|---|---|
| | 1 | 2 | 3 | 4 | 5 | 6 | 7 | 1 | 2 | 3 |
| material | Carbon 1 | Carbon 2 | Carbon 2 | Carbon 1 | Carbon 1 | Carbon 2 | Carbon 1 | PET | Aramid | Carbon 3 |
| total fineness (tex) | 400 | 800 | 800 | 400 | 400 | 800 | 400 | 730 | 330 | 200 |
| configuration | single twist | single twist | single twist | single twist | single twist | single twist | single twist | 2 × 3 organzine | 1 × 2 Lang's lay | single twist |
| number of twist (times/10 cm) | 8 | 6 | 6 | 10 | 12 | 4 | 10 | 21 × 11 | 4 × 13 | 8 |
| core wire diameter (mm) | 0.8 | 1.1 | 1.1 | 0.8 | 0.8 | 1.1 | 0.8 | 1.0 | 0.7 | 0.5 |
| core wire pitch (mm) | 1.0 | 1.5 | 1.3 | 1.0 | 1.0 | 1.3 | 0.8 | 1.1 | 0.9 | 1.0 |
| tensile strength (N/mm) | 730 | 785 | 840 | 610 | 590 | 1000 | 760 | 365 | 560 | 420 |
| tensile elastic modulus (N/mm · %) | 330 | 400 | 430 | 250 | 240 | 500 | 400 | 50 | 190 | 160 |
| running life (hr) | 300 or more | 300 or more | 300 or more | 216 | 200 | 192 | 300 or more | 24 | 96 | 118 |
| failure form | — | — | — | broken | broken | popping out | — | broken | broken | broken |
| remaining tensile strength (N/mm) | 440 | 470 | 500 | — | — | — | 480 | — | — | — |

As is apparent from the results of Table 3, in Comparative Example 1 using the PET core wire and Comparative Example 2 using the aramid core wire, the life ended before 100 hours in the durability running test. In addition, also in Comparative Example 3 in which a twisted cord of carbon fibers was included but the core wire diameter was thin and the tensile strength and the tensile elastic modulus was low, the life ended in a short time. On the other hand, in each of Examples 1 to 7, the tensile strength and the tensile elastic modulus were high, and a life of 192 hours or more was shown in the durability running test. Thus, those belts were judged as applicable to an application where high dynamic tension is generated. Particularly in Examples 1 to 3 and 7, a running life of 300 hours or more was attained, and excellent durability was shown. Among them, Example 3 which was the highest in remaining tensile strength can be judged to have especially excellent durability. In Examples 4 and 5, when the number of twist was increased, the tensile strength and the tensile elastic modulus were lowered, and the running life was reduced as compared with Example 1. Further, in Example 6, when the number of twist was reduced, the tensile elastic modulus was increased to increase the fluctuation of tension. Maybe for this reason, the core wire popped out (the core wire popped out from the belt side surface). Thus, the running life was reduced as compared with Example 1. On the other hand, in Example 7, when the core wire pitch was reduced to make the core wire diameter and the core wire pitch equal to each other, the running life of the belt did not decrease even when the number of twist was increased. However, there occurred a phenomenon that the treated cords adjacent to each other overlapped each other when the treated cord is wound spirally, such that the workability in preparation of the belt deteriorated.

INDUSTRIAL APPLICABILITY

The V-ribbed belt according to the present invention can be used as a V-ribbed belt for use in accessory drive of an automobile engine. The V-ribbed belt can transmit power with a narrow belt width and is excellent in durability. Therefore, the V-ribbed belt can be used particularly suitably as a V-ribbed belt for driving an engine mounted with an ISG where high dynamic tension is generated.

Although the preferred embodiment of the present invention has been described above in detail, the present invention is not limited to the aforementioned specific embodiment. Various modifications or changes can be made within the scope of the gist of the present invention stated in the claims. The present application is based on a Japanese patent application (Application No. 2017-130977) filed on Jul. 4, 2017, and a Japanese patent application (Application No. 2018-122265) filed on Jun. 27, 2018, the contents of which are incorporated herein by reference.

REFERENCE SIGNS LIST

1 . . . core wire
2 . . . compression rubber layer
3 . . . V-rib portion
4 . . . adhesion rubber layer
5 . . . tension layer

The invention claimed is:

1. A V-ribbed belt comprising a twisted cord comprising a carbon fiber as a core wire, wherein:
    the V-ribbed belt has a tensile elastic modulus of 240 to 500 N/(mm %), wherein the tensile elastic modulus of the V-ribbed belt is an inclination of a straight line in an area of 85-140 N/mm in a stress-strain curve;
    the core wire has a core wire diameter of 0.6 to 1.2 mm; and
    the core wire has a pitch that is 0.1 to 0.5 mm larger than the core wire diameter.

2. The V-ribbed belt according to claim 1, having a tensile strength of 620 N/mm or more per 1 mm width of the V-ribbed belt.

3. The V-ribbed belt according to claim 1, having a total fineness of the core wire of 300 to 900 tex.

4. The V-ribbed belt according to claim 1, wherein the core wire is a single-twisted yarn in which a plurality of carbon fiber filaments are arranged and then twisted in one direction, and a number of twists is 5 to 10 times/10 cm.

5. The V-ribbed belt according to claim 1, comprising a compression rubber layer comprising staple fibers protruding from a surface thereof.

6. The V-ribbed belt according to claim 1, having a number of ribs of 3 to 5.

7. The V-ribbed belt according to claim 1, having an average width of 7 to 22 mm.

8. The V-ribbed belt according to claim 1, which is attached to an engine mounted with a belt-type ISG drive in which a dynamic tension per 1 mm width of the V-ribbed belt exceeds 85 N/mm.

9. The V-ribbed belt according to claim 1, which is attached to an engine mounted with a belt-type ISG drive including a tensioner at a back surface of the V-ribbed belt, wherein the V-ribbed belt comprises a tension layer selected from the group consisting of a tension layer whose surface is covered with a cloth, a tension layer which includes staple fibers, and a tension layer whose surface is covered with a cloth and which includes staple fibers.

* * * * *